(12) United States Patent
Gloss et al.

(10) Patent No.: US 11,698,177 B2
(45) Date of Patent: Jul. 11, 2023

(54) FLAT LIGHT GUIDE FOR A VEHICLE LIGHTING DEVICE AND A VEHICLE LIGHTING DEVICE

(71) Applicant: Varroc Lighting Systems, s.r.o., Senov u Noveho Jicina (CZ)

(72) Inventors: Tomas Gloss, Vitkov (CZ); Ales Hendrych, Hostalkova (CZ); Jakub Hruska, Hlucin (CZ)

(73) Assignee: PO LIGHTING CZECH S.R.O.

( * ) Notice: Subject to any disclaimer, the term of this patent is extended or adjusted under 35 U.S.C. 154(b) by 0 days.

(21) Appl. No.: 17/835,154

(22) Filed: Jun. 8, 2022

(65) Prior Publication Data
US 2022/0397251 A1 Dec. 15, 2022

(30) Foreign Application Priority Data
Jun. 10, 2021 (CZ) .................. CZ2021-295

(51) Int. Cl.
*F21S 41/24* (2018.01)
*F21V 8/00* (2006.01)
(Continued)

(52) U.S. Cl.
CPC ............... *F21S 41/24* (2018.01); *F21S 41/33* (2018.01); *F21S 43/239* (2018.01);
(Continued)

(58) Field of Classification Search
CPC .......... F21S 41/33; F21S 41/24; F21S 43/239; F21S 41/148; F21S 43/243; F21S 41/285;
(Continued)

(56) References Cited

U.S. PATENT DOCUMENTS

| 10,161,592 | B2 * | 12/2018 | Laminette | ............. F21S 41/365 |
| 2017/0336042 | A1 | 11/2017 | Laminette | |
| 2018/0356582 | A1 * | 12/2018 | Sousek | ................. F21S 43/243 |

FOREIGN PATENT DOCUMENTS

| CZ | 2017338 | A3 | 8/2018 | |
| CZ | 201700338 | A3 * | 8/2018 | ............ F21S 41/148 |

(Continued)

OTHER PUBLICATIONS

Search English translation of EP 2530372 A1 (Year: 2012).*

(Continued)

*Primary Examiner* — Omar Rojas Cadima
(74) *Attorney, Agent, or Firm* — Ostrolenk Faber LLP (57) ABSTRACT

A flat light guide (1) for a vehicle lighting device, which includes a rear end (10) and a front end with a light output surface (13), the light guide (1) being defined between the two ends by a pair of side surfaces (11, 12). The light guide (1) has a base plane (X-Y) and at its rear end (10) is provided with at least one collimating element (2) arranged transversely or obliquely with respect to the plane (X-Y). Opposite the collimating element (2) is arranged an obliquely inclined reflective surface (3) to reflect light from the collimating element (2) into the flat light guide (1). The collimating element (2) is adapted for the light input from the light source into the light guide (1) which further guides the light between the side surfaces (11, 12) to the output surface (13).

7 Claims, 6 Drawing Sheets

(51) Int. Cl.
*F21S 43/239* (2018.01)
*F21S 41/33* (2018.01)

(52) U.S. Cl.
CPC ......... *G02B 6/0018* (2013.01); *G02B 6/0055* (2013.01); *F21V 2200/20* (2015.01)

(58) Field of Classification Search
CPC .... G02B 6/0018; G02B 6/0055; G02B 27/30; G02B 6/0028; G02B 6/0045; G02B 6/0046; G02B 6/002; F21V 2200/20; F21V 7/0091
See application file for complete search history.

(56) References Cited

FOREIGN PATENT DOCUMENTS

| | | | | |
|---|---|---|---|---|
| EP | 2530372 A1 | * | 12/2012 | ............ F21S 48/215 |
| EP | 3176500 A1 | | 6/2017 | |
| JP | 2018-137127 A | | 8/2018 | |

OTHER PUBLICATIONS

Search English translation of CZ-201700338-A3 (Year: 2018).*
Search Report, dated Nov. 30, 2021, issued in corresponding Czech. Republic Patent Application No. PV 2021-295.

* cited by examiner

FLAT LIGHT GUIDE FOR A VEHICLE LIGHTING DEVICE AND A VEHICLE LIGHTING DEVICE

CROSS-REFERENCE TO RELATED APPLICATION

The present application claims priority to Czech Republic patent application no. PV 2021-295 filed Jun. 10, 2021, the content of which is incorporated herein by reference.

TECHNICAL FIELD

The invention relates to a flat light guide for a vehicle lighting device, which includes a rear end and a front end arranged opposite, the front end of the flat light guide being provided with a light output surface, whereby the flat light guide is defined by a pair of side surfaces between the rear end and the front end, whereby the light guide has a base plane and is provided at its rear end with at least one collimating element which is arranged transversely or obliquely with respect to the base plane of the flat light guide. Opposite the collimating element, an obliquely inclined reflective surface is arranged, which is adapted to reflect light from the collimating element into the light guide and the collimating element is adapted for the entry of light from the light source into the light guide, whereby the light guide is adapted to guide light from the collimating element between the side surfaces of the light guide to the light output surface, the light guide having an end tip defined by the peripheral area of the light output surface and the side surface.

The invention also relates to a vehicle lighting device comprising at least one flat light guide to which at least one light source is assigned.

BACKGROUND ART

In modern automobiles, flat light guides which are formed by a thin body of various spatial shapes are used for lighting. At one end, the flat light guide is assigned to one or more light sources, the light is guided through the flat light guide to the other end of the flat light guide, where the light is directed from the output surface of the flat light guide in the desired direction in which the light is emitted. In this case, it is important that the intensity of the radiation emerging from the output surface of the flat light guide is as uniform as possible over the entire area of the output surface of the flat light guide, while maintaining sufficient intensity and brightness of the exiting light in the desired direction of illumination.

EP 3 176 500 discloses a flat light guide, which is designed to improve the visibility of the illuminating light output surface of the light guide from different directions. At one end, the light guide is associated with a plurality of light sources. The light from each light source enters the flat light guide through a focusing device which collimates this light in the desired direction. Each focusing device is provided with a reflective surface structured to receive a portion of the light collimated by the focusing device from the light source, the reflective surface being inclined with respect to the direction of radiation collimated by the focusing device so as to reflect this portion of the incident light by total reflection in a direction different from the direction of the light collimated by the focusing device. Thus, the light is guided by the flat light guide to the light output surface in different directions, wherein this light is also emitted from the surface light guide in different directions and the light outlet surface of the flat light guide is clearly visible from different directions. This solution is particularly advantageous for different position lights, side lights or direction indicator lights, since the light intensity for these light functions is relatively evenly dispersed over the entire length of the flat light guide, which improves the visibility of the outlet surface of the flat light guide from different angles.

The disadvantage of this solution is the reduction of light intensity (light output) in the direction directly in front of the flat light guide. As a result, for example, a significantly more powerful light source must be used for the needs of creating a low beam or high beam, which usually leads to an increase in power consumption, an increase in the temperature of the lighting device, the need for cooling or improved cooling, a higher risk of overheating and malfunctions, as well as a higher price.

JP 2018 137127 discloses a flat light guide which has on its rear side a line of trapezoidal projections, to the rear surfaces of which are assigned light sources. The trapezoidal projections have side surfaces which, on the one hand, form a directional cone of light from the light source and, on the other hand, reflect the light rays by means of total reflection from the light source towards the volume of the flat light guide and to the front wall of the flat light guide which is serrated and serves as a light output surface from the light guide. The outermost trapezoidal projections are formed in such a manner that the outermost light rays hit the side walls of the flat light guide, from which they are directed by total reflection to the front wall of the light guide, from which they are subsequently lighted out.

The disadvantage of this arrangement is the divergent direction of the light rays emitted from the front wall of the flat light guide, which, although it improves the visibility of the light guide front wall from different, even lateral, angles of view, it reduces the light output of the light guide in the direction directly in front of the flat light guide. Light guides of this type are therefore generally unsuitable for creating low beam or high beam functions.

The objective of the invention is to remove or at least reduce the above-mentioned disadvantages of the background art.

SUMMARY OF THE INVENTION

The objective of the invention is achieved by a flat light guide for a vehicle lighting device, whose principle consists in that at least one reflective surface comprises at least one compensating optical element, which is adapted to reflect at least part of the light incident on this reflective surface in the direction of rays obliquely to the side surface of the flat light guide as far as to the end tip area, this side surface being adapted to reflect these rays into the peripheral area of the light output surface.

The principle of the vehicle lighting device consists in that it includes at least one light guide according to any of claims 1 to 6.

The advantage of the present invention is that the side surface of the flat light guide is thus illuminated as far as to the area of the end tip of the light guide, so that the rays are reflected to the light output surface also in the peripheral area of the light output surface. Consequently, also this peripheral area of the light output surface is evenly illuminated by second rays and the exiting rays then emerge therefrom in a precisely defined desired output direction with the required intensity. The other rays, which are reflected by the reflective optical element or other reflective optical elements from the collimating element into the flat light guide, are reflected directly to the light output surface on which they fall at a defined angle, whereupon a defined refraction of the first light rays occurs due to a change of environment at the light output surface. Subsequently, the first light rays exit from the light output surface at the defined angle and in a precisely defined desired output direction of the exiting rays. The light output surface outside the peripheral area of the light output surface is thus evenly illuminated by the first rays and the exiting rays then emerge therefrom in the precisely defined desired output direction with the desired intensity.

Preferred embodiments of the invention are the subject matter of the dependent patent claims.

DESCRIPTION OF THE DRAWINGS

The invention is schematically represented in a drawing, wherein

FIG. 2b is a bottom perspective view of the embodiment of FIGS. 2 and 2a.

EXAMPLES OF EMBODIMENT

The invention will be described with reference to two exemplary embodiments of a flat light guide 1 which is at its rear end 10 provided with at least one collimating element 2. The flat light guide 1 it is provided with side surfaces 11 and 12 on its sides and at its front end it is further provided with a light output surface 13. The light output surface 13 is a smooth and continuous surface from which light rays P emerge in the desired direction X. The flat light guide 1 has a base plane X-Y, which is understood here as a plane which at each point of the surface of the flat light guide 1 is perpendicular to the normal erected at this point of the surface of the flat light guide. The flat light guide is defined by an upper wall H and a bottom wall D. The flat light guide 1 is either planar or spatially shaped, whereby the flat light guide exhibits the presence of the base plane X-Y at each point of its surface.

The collimating element 2 is arranged transversely to the base plane X-Y of the flat light guide 1, e.g., it is arranged perpendicularly or obliquely to the base plane X-Y of the flat light guide 1. The collimating element 2 is provided with an input light portion 20, which is intended to be assigned to an unillustrated light source, and with collimating surfaces 21 to reflect light rays P from the light source to the direction K of the length of the collimating element 2, i.e., to the collimated direction.

An obliquely inclined reflective surface 3 is arranged opposite the collimating element 2. The inclined reflective surface 3 reflects light from the collimating element 2 into the flat light guide 1, i.e., from the direction K of the length of the collimating element 2 to the base plane X-Y of the flat light guide 1.

At least one reflective surface 3 includes a compensating optical element 30 which reflects at least part of the light, i.e., part of the incoming rays P, incident on the reflective surface 3 in a defined direction at a defined angle $\alpha$ in the form of the second rays P2 towards the side surface 12 of the flat light guide 1, on which these second rays P2 fall at a defined angle $\beta$ and from which, in turn, these second rays P2 are reflected at the defined angle $\beta$ towards the light output surface 13 on which they fall at a defined angle $\gamma$. Due to a change of environment, a defined refraction of the second light rays P2 occurs at the light output surface 13, and subsequently these second light rays P2 exit from the light output surface 13 at a defined angle $\delta$ and in a precisely defined desired output direction X of the exiting rays P. The side surface 12 of the flat light guide 1 is illuminated by the second rays P2 in its length as far as to the region of the end tip S, consequently the second rays P2 are reflected to the light output surface 13 also in the peripheral area O of the light output surface 13, and therefore also this peripheral area O of the light output surface 13 is evenly illuminated by the second rays P2, and the exiting rays P then emerge from it in the precisely defined desired output direction X with the required intensity.

The other rays P, which are reflected by the reflective surface 3 or the other reflective surfaces 3 from the collimating element 2 into the flat light guide 1, i.e., from the direction K of the length of the collimating element 2 to the base plane X-Y of the flat light guide 1, are reflected in the form of first rays P1 and are reflected directly to the light output surface 13, on which they fall at the defined angle $\gamma$, whereupon, due to a change of environment, a defined refraction of the first light rays P1 occurs on the light output surface 13, which subsequently exit from the light output surface 13 at the defined angle $\delta$ and in the precisely defined desired output direction X of the exiting rays P. The output light surface 13 outside the peripheral area O of the light output surface 13 is thus evenly illuminated by the first rays P1 and from it emerge the exiting rays P with the required intensity in the precisely defined desired output direction X.

Figure 1:
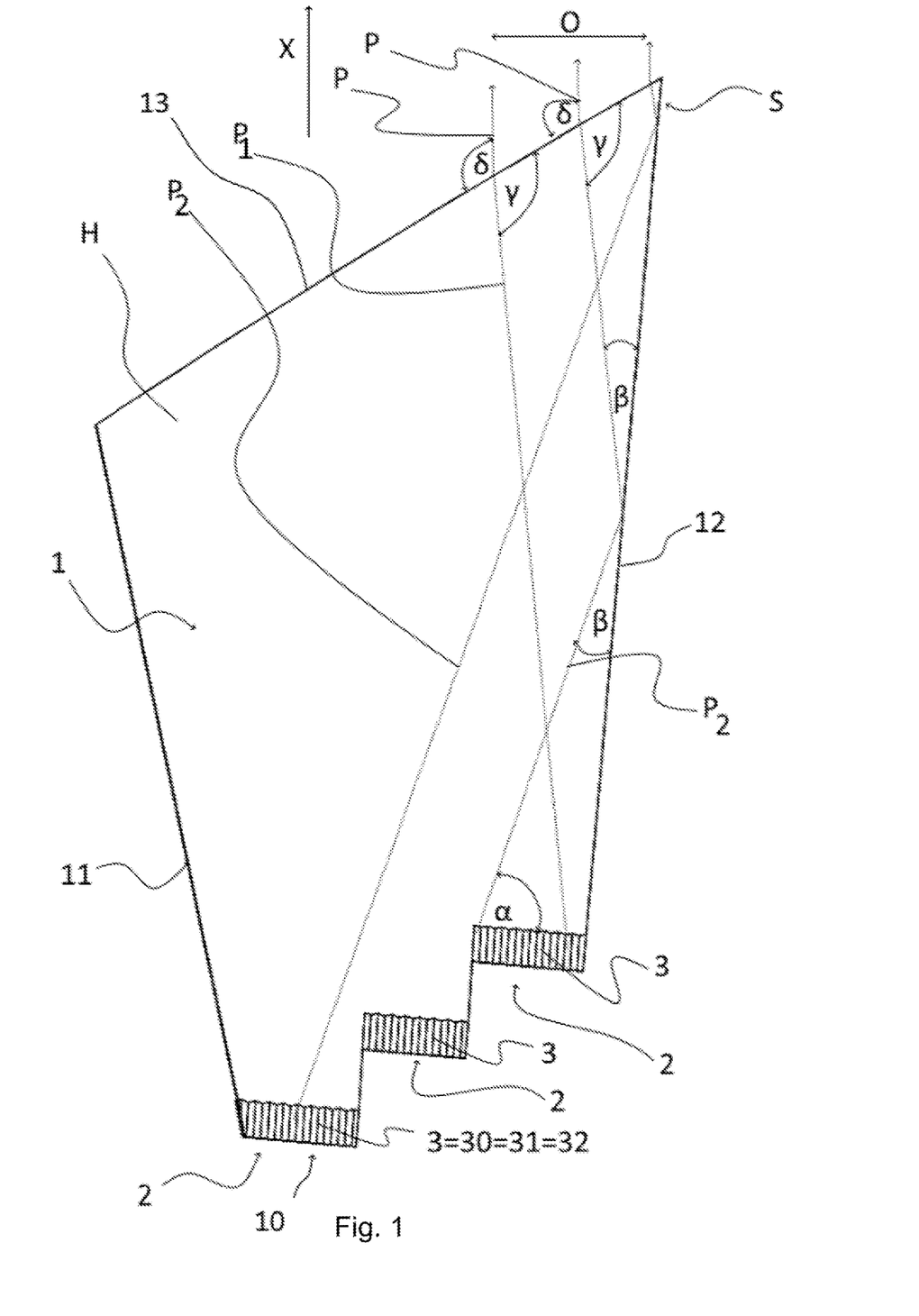
FIG. 1 shows a plan view of an arrangement of a flat light guide according to a first example of embodiment.
Figure 1A:
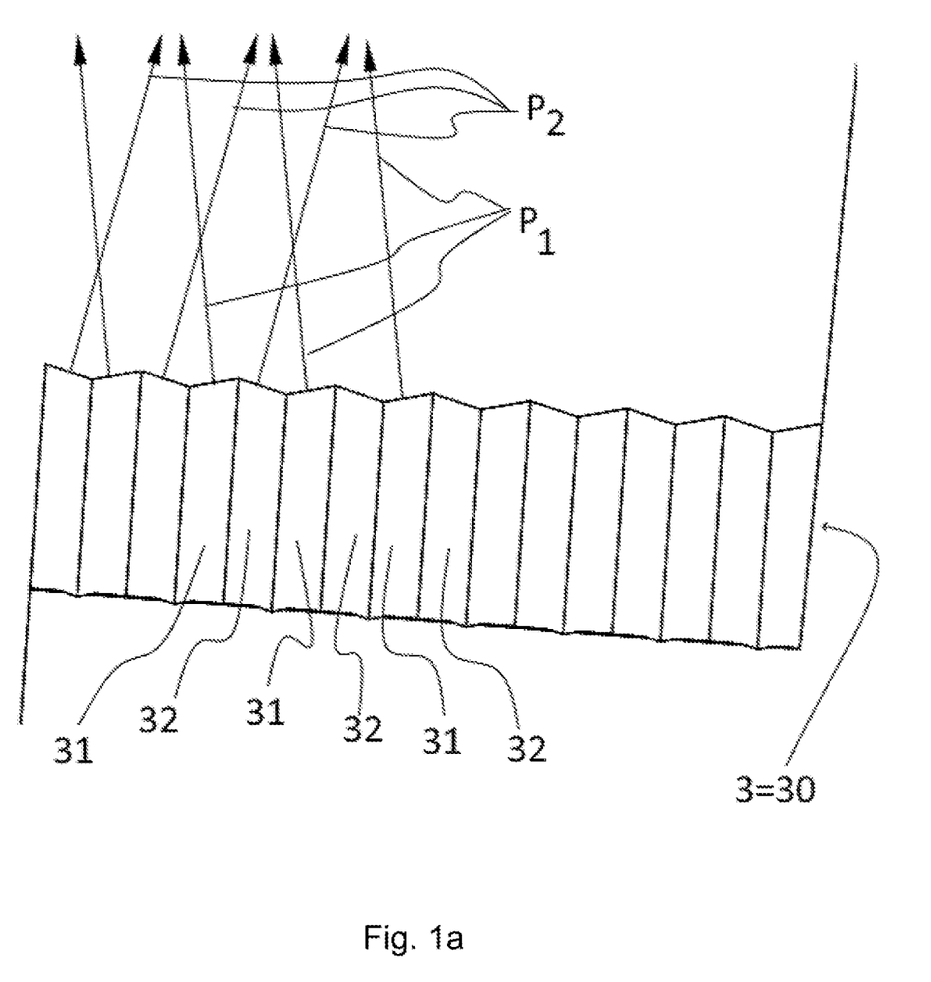
FIG. 1a shows a detail of a compensating optical element of FIG. 1.
Figure 1B:
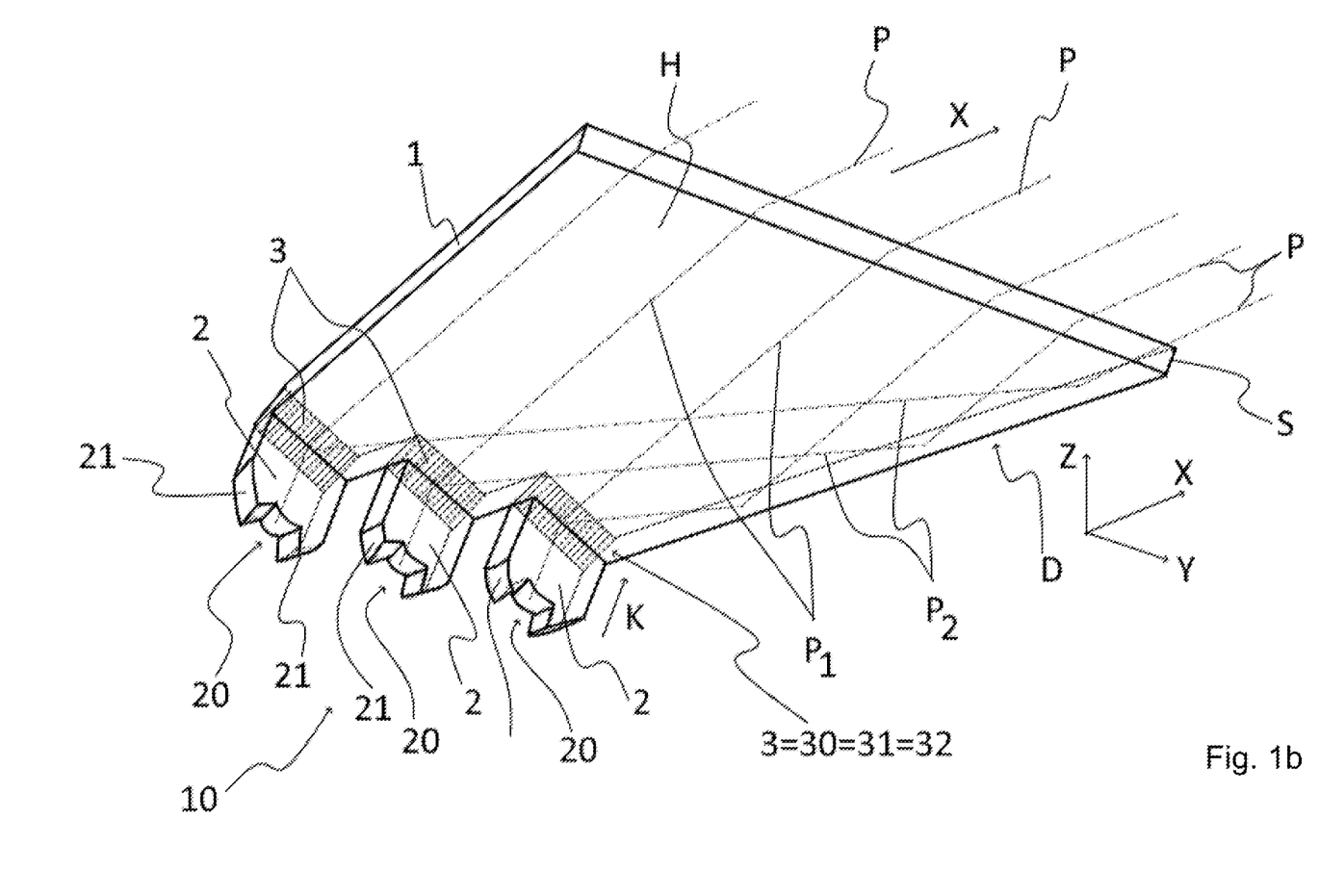
FIG. 1b shows a perspective view of the embodiment of the flat light guide of FIGS. 1 and 1a, FIG. 2 shows a plan view of an arrangement of a flat light guide according to a second example of embodiment.

In an example of embodiment shown in FIGS. 1 to 1b, the compensating optical element 30 comprises a set of first reflective surfaces 31 and of second reflective surfaces 32 which are arranged on the surface of the compensating optical element 30, in the embodiment shown, they are arranged on the entire area of the reflective surface 3. The first reflective surfaces 31 are set to reflect the incident rays P directly to the light output surface 13 in the form of the first rays P1, whereby the second reflective surfaces 32 are set to reflect the incident rays P to the side surface 12 of the flat light guide 1 in the form of the second rays P2 and only by the reflection from it falling on the light output surface 13, as described above.

In an unillustrated example of embodiment, only the compensating optical element 30 of one reflective surface 3 of all the reflective surfaces 3 used is provided with a set of first reflective surfaces 31 and of second reflective surfaces 32, or only some of the reflective surfaces 3 are provided with a set of first reflective surfaces 31 and of second reflective surfaces 32.

Figure 2:
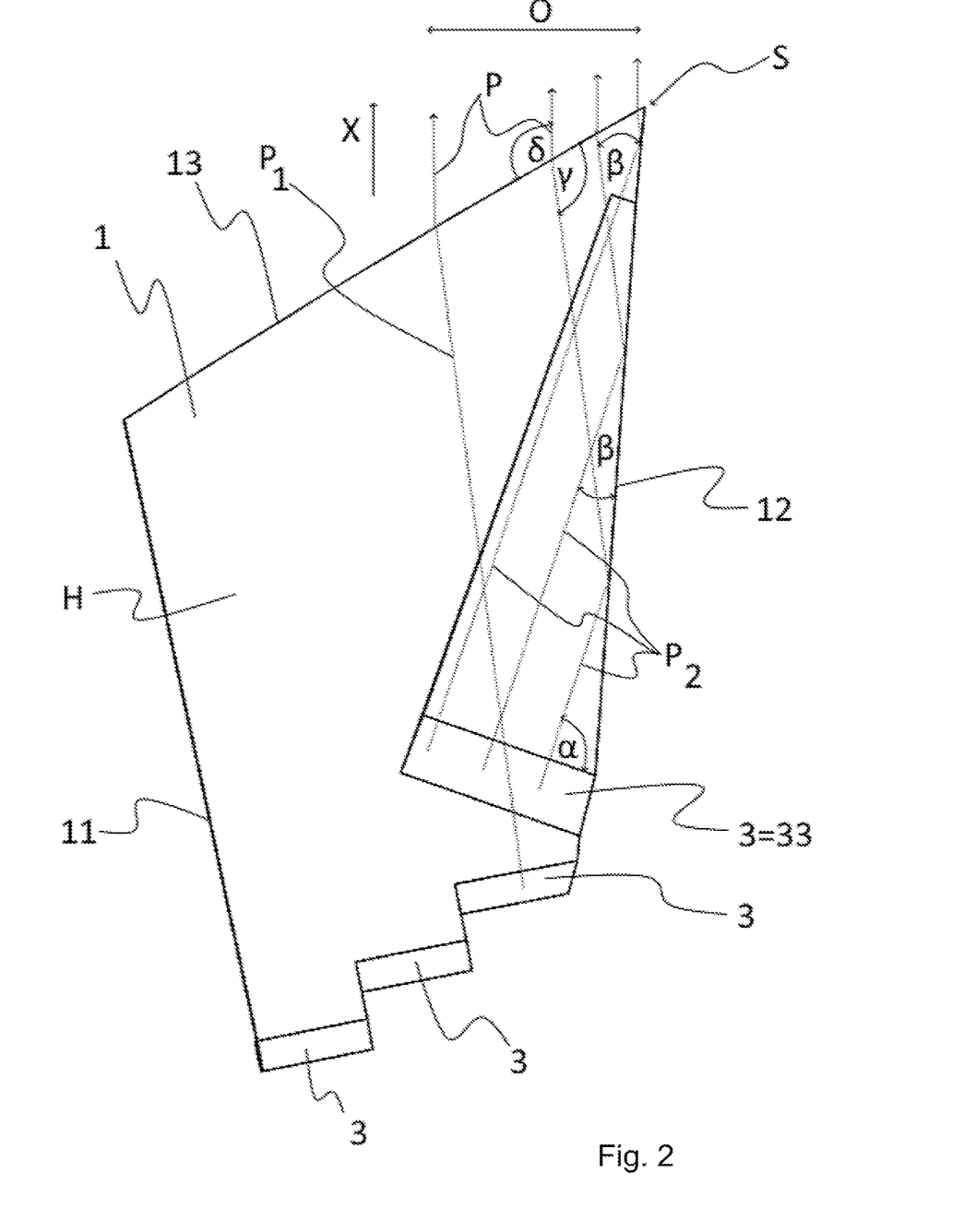
Figure 2A:
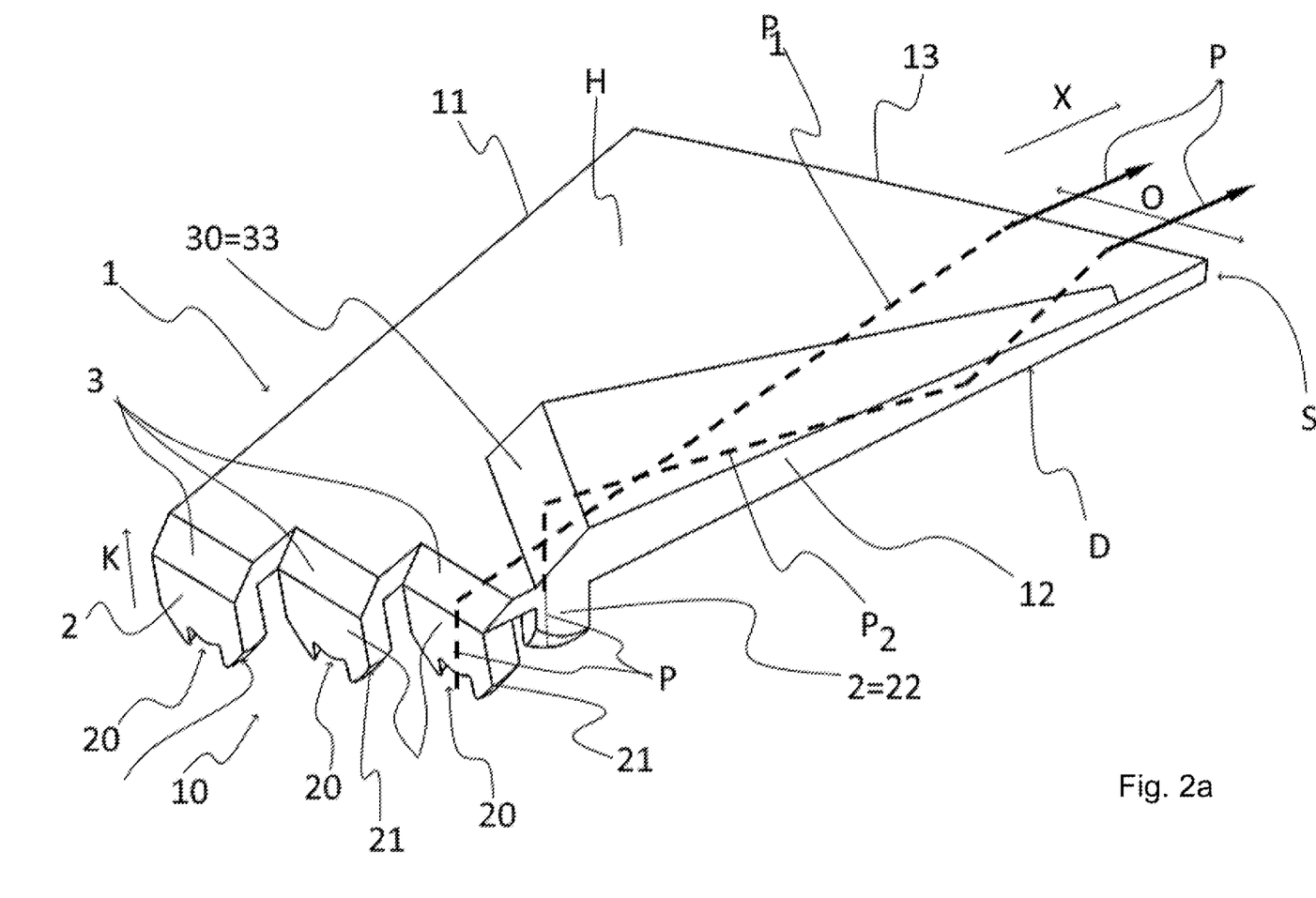
FIG. 2a is a top perspective view of the embodiment of FIG. 2
Figure 2B:
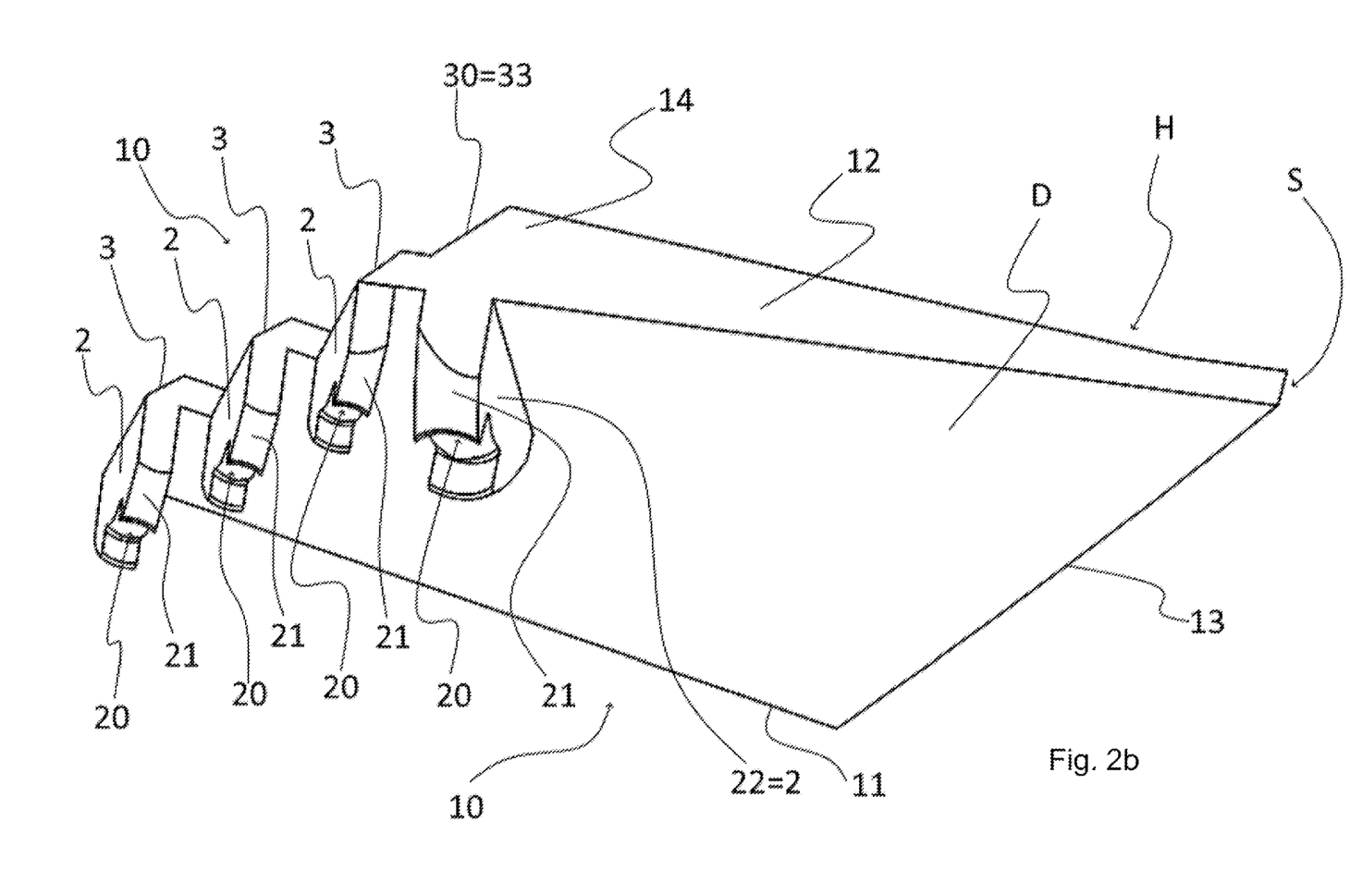

In an embodiment shown in FIGS. 2 to 2b, the compensating optical element 30 is formed as a continuous reflective compensating surface 33 at a rear end of a longitudinal extension 14 on the upper surface H or lower surface D of the flat light guide 1, i.e., in the region of the rear end 10 of the flat light guide 1, whereby the continuous reflective compensating surface 33 is inclined longitudinally with respect to the base plane X-Y of the flat light guide 1 and a light input is situated against the continuous reflective compensating surface 33. Due to the position of the continuous reflective compensating surface 33 and its relation to the other parts of the flat light guide 1 the inclination of the continuous reflective compensating surface 33 with respect to the base plane X-Y of the flat light guide 1 is different from the inclination of the reflective surface 3 with respect to the base plane X-Y of the flat light guide 1. In relation to the inclination of the continuous reflective compensating surface 33 with respect to the base plane X-Y of the flat light guide 1 the side surface 12 of the flat light guide 1 is also inclined with respect to the base plane X-Y of the flat light guide 1 to ensure the function of this side surface 12 for reflecting the rays P incident on this side surface 12 of the flat light guide 1 in the form of second rays P2 directed from the continuous reflective compensating surface 33 and only by reflection from the side surface 12 of the flat light guide 1 directed and incident on the light output surface 13 of the flat light guide 1. Arranged against the inclined continuous reflective compensation surface 33 is a compensating light input, in the illustrated embodiment in the form of a compensating collimating element 22 arranged on the flat light guide 1, to which an unillustrated compensating light source is assigned. The entire continuous reflective compensating surface 33 is set to reflect all incident rays P at the defined angle α to the side surface 12 of the flat light guide 1 on which these rays P fall at the defined angle β in the form of second rays P2 and only by defined reflection therefrom these second rays P2 then hit the light output surface 13 at the defined angle γ. These second rays P2 are refracted at the light output surface 13 in a defined manner and subsequently emerge from the light output surface 13 at the defined angle δ and in the precisely defined desired output direction X in the form of exiting rays P, as described above.

In the exemplary embodiment in FIGS. 2 to 2b, opposite the collimating elements 2 at the rear end 10 of the flat light guide 1 are situated reflective surfaces 3 formed by continuous planar reflective surfaces which are directed to reflect the incident rays P directly to the light output surface 13 in the form of the first rays P1. These first light rays P1 strike the light output surface 13 at the defined angle γ and, by subsequent defined refraction at the light output surface 13 exit from the light output surface 13 at the defined angle δ in the precisely defined desired output direction X of the exiting rays P.

INDUSTRIAL APPLICABILITY

The invention is applicable to a vehicle lighting device.

The invention claimed is:

1. A flat light guide for a vehicle lighting device, which comprises a rear end and a front end arranged opposite the rear end, the front end being provided with a light output surface, wherein the flat light guide is defined by a pair of side surfaces between the rear end and the front end, wherein the light guide has a base plane (X-Y) and is provided at its rear end with at least one collimating element, which is arranged transversely or obliquely with respect to the base plane (X-Y) of the flat light guide, and opposite the collimating element is arranged an obliquely inclined reflective surface adapted to reflect light from the collimating element into the flat light guide, the collimating element being adapted for light entry from a light source into the flat light guide and the flat light guide being adapted to guide the light from the collimating element between the side surfaces of the flat light guide to the light output surface, wherein the flat light guide has an end tip (S) defined by the peripheral area (O) of the light output surface and the side surface, wherein at least one obliquely inclined reflective surface includes at least one compensating optical element which is adapted to intentionally reflect at least parts of the light incident on the obliquely inclined reflective surface into the direction of the rays (P2) intentionally obliquely to the side surface of the flat light guide as far as to a region of the end tip (S) and the side surface is adapted to reflect these intentionally obliquely directed rays (P2) also to the peripheral area (O) of the light output surface.

2. The flat light guide according to claim 1, wherein the compensating optical element of at least one reflective surface includes a set of first reflective surfaces and second reflective surfaces, the first reflective surfaces being adapted to reflect the incident rays (P) directly to the light output surface in the form of first rays (P1) and the second reflective surfaces are adapted to reflect the incident rays (P) to the side surface of the flat light guide in the form of second rays (P2).

3. The flat light guide according to claim 1, wherein the compensating optical element is formed as a continuous reflective compensating surface arranged on a longitudinal extension on the flat light guide and opposite the inclined continuous compensating surface, an input of the compensating light is arranged, wherein the continuous reflective compensating surface is adapted to reflect the incident compensating light towards the side surface of the flat light guide.

4. The flat light guide according to claim 3, wherein the compensating light input comprises a compensating collimating element arranged on the flat light guide.

5. The flat light guide according to claim 1, wherein the side surface of the flat light guide is inclined relative to the base plane (X-Y) of the flat light guide.

6. The flat light guide according to claim 1, wherein the reflective surfaces at the rear end of the light guide consist of continuous planar reflective surfaces which are adapted to reflect all the incident rays (P) directly to the light output surface.

7. A vehicle lighting device comprising at least one flat light guide to which is assigned at least one light source, wherein at least one light guide consists of a flat light guide according to claim 1.

* * * * *